United States Patent
Rath et al.

(10) Patent No.: US 11,706,447 B2
(45) Date of Patent: *Jul. 18, 2023

(54) METHOD AND APPARATUS FOR INTRA PREDICTION WITH MULTIPLE WEIGHTED REFERENCES

(71) Applicant: InterDigital Madison Patent Holdings, SAS, Paris (FR)

(72) Inventors: Gagan Rath, Bhubaneswar (IN); Tangi Poirier, Thorigné-Fouillard (FR); Fabrice Urban, Thorigne Fouillard (FR)

(73) Assignee: InterDigital Madison Patent Holdings, SAS, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 17/512,203

(22) Filed: Oct. 27, 2021

(65) Prior Publication Data

US 2022/0159296 A1 May 19, 2022

Related U.S. Application Data

(63) Continuation of application No. 16/624,472, filed as application No. PCT/EP2018/066880 on Jun. 25, 2018, now Pat. No. 11,172,221.

(30) Foreign Application Priority Data

Jun. 26, 2017 (EP) .................................... 17305794
Jul. 12, 2017 (EP) .................................... 17305921

(51) Int. Cl.
*H04N 19/593* (2014.01)
*H04N 19/176* (2014.01)
(Continued)

(52) U.S. Cl.
CPC ......... *H04N 19/593* (2014.11); *H04N 19/176* (2014.11); *H04N 19/182* (2014.11); *H04N 19/96* (2014.11)

(58) Field of Classification Search
CPC .......................... H04N 19/593; H04N 19/159
See application file for complete search history.

(56) References Cited

U.S. PATENT DOCUMENTS 9,374,578 B1 6/2016 Mukherjee et al.
2012/0163451 A1 6/2012 Cohen et al.
(Continued)

FOREIGN PATENT DOCUMENTS

CN 105227960 A 1/2016
WO WO 2016205718 A1 12/2016

OTHER PUBLICATIONS

Chang et al., "EE6: Arbitrary Reference Tier for Intra Directional Modes, With Supplementary Results", JVET-D0099, (JVET) of ITU-T SG 16 WP 3 and ISO/IEC JTC 1/SC 29/WG 11 4th Meeting: Chengdu, CN, Oct. 15-21, 2016.
(Continued)

*Primary Examiner* — Jerry T Jean Baptiste
(74) *Attorney, Agent, or Firm* — Jamie T. Nguyen

(57) ABSTRACT

A method of performing intra prediction for encoding or decoding uses multiple layers of reference samples. The layers are formed into reference arrays that are used by a function, such as a weighted combination, to form a final prediction. The prediction is used in encoding or decoding a block of video data. The weights can be determined in a number of ways, and for a given prediction mode, the same weights, or different weights can be used for all pixels in a target block. If the weights are varied, they can depend on the distance of the target pixel from reference arrays.

20 Claims, 11 Drawing Sheets

(51) Int. Cl.
*H04N 19/182* (2014.01)
*H04N 19/96* (2014.01)

(56) References Cited

U.S. PATENT DOCUMENTS

2016/0323584 A1* 11/2016 Chuang ................ H04N 19/593
2017/0094285 A1* 3/2017 Said ..................... H04N 19/593

OTHER PUBLICATIONS

Chen, Jianle, et al., "Algorithm Description of Joint Exploration Test Model 6 (JEM 6)", Document JVET-F1001-v2, Joint Video Exploration Team (JVET) of ITU-T SG 16 WP 3 and ISO/IEC JTC 1/SC 29/WG 11, 6th Meeting: Hobart, XU, Mr 31-Apr. 7, 2017, 49 pages.
Panusopone et al., "Unequal Weight Planar Prediction and Constrained PDPC", Document: JVET-E0068-r1, Joint Video Exploration Team (JVET) of ITU-T SG 16 WP 3 and ISO/IEC JTC 1/SC 29/WG 11, 5th Meeting: Gevena, CH, pp. 1-6, Jan. 12-20, 2017.
Matsuo, Shohei, et al., "Intra Prediction with Spatial Gradients and Multiple Reference Lines", Picture Coding Symposium, May 6, 2009, 4 pages.
Chang et al., "Arbitrary Reference Tier for Intra Directional Modes", JVET-C0043, JVET of ITU-T SG 16 WP3 and ISO/IEC JTC 1/SC 29/WG 11, 3rd Meeting, Geneva, CH, May 26-Jun. 1, 2016.
Li, Jiahao, "Multiple line-based intra prediction", JVET-C0071, Joint Video Exploration Team (JVET) of ITU-T SG 16 WP 3 and ISO/IEC JTC 1/SC 29/WG 11, 3rd Meeting: Geneva, CH, May 26-Jun. 1, 2016, 6 pages.

* cited by examiner

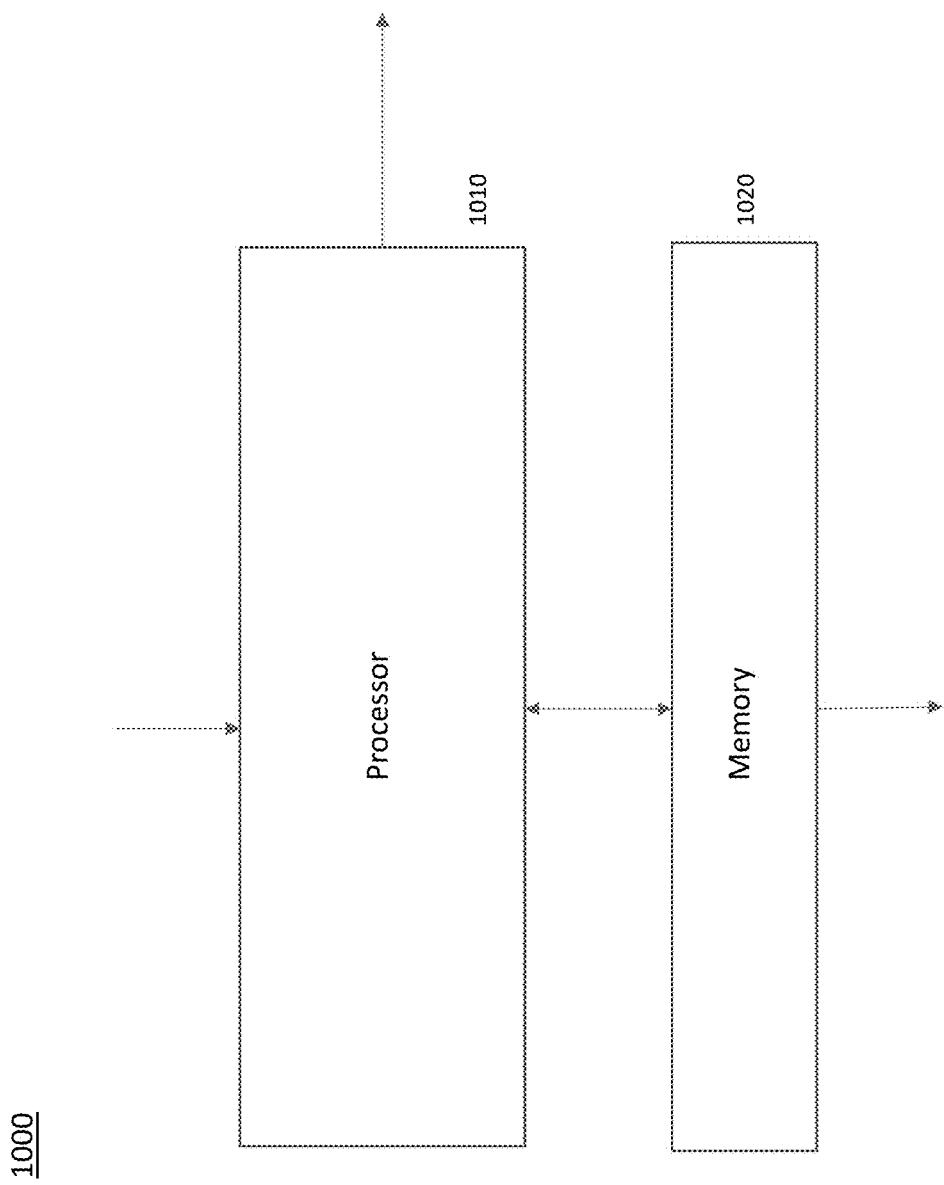

METHOD AND APPARATUS FOR INTRA PREDICTION WITH MULTIPLE WEIGHTED REFERENCES

This application is a § 371 U.S. National Stage entry of PCT Application No. PCT/EP2018/066880, filed Jun. 25, 2018, which is a non-provisional filing of, and claims the benefit of European Provisional Patent Application Nos. 17305794.4, filed on Jun. 26, 2017, and 17305921.3, filed on Jul. 12, 2017, the contents of each of which are hereby incorporated by reference herein.

FIELD OF THE INVENTION

The present principles relate to video compression and more particularly to performing intra prediction coding and decoding with multiple weighted reference layers of an image block.

BACKGROUND OF THE INVENTION

There have been several proposals for multi-reference intra prediction in recent video coding standards discussions. The proposals use up to 4 reference layers for predicting a target block. For a given prediction mode, they use each reference layer to make the prediction for the target block. The reference layer producing the best RD (Rate-Distortion) performance is signaled to the decoder so that the decoder uses the same reference layer as the encoder. The prediction with any reference layer can be made in the same manner as done in HEVC (High Efficiency Video Coding, Recommendation ITU-T H.265), or predictions made from the reference layers farther from the target block can be improved by compensating for the residues for the reference layers closer to the target block. That is, the reference layer n, n>1, can also predict the pixels on the reference layers 1, 2 . . . n−1. Since the reference layers are known both to the encoder and to the decoder, the prediction residues for these reference layers can be compensated to improve the prediction for the target block pixels. These two proposals require high complexity at the encoder since an encoder has to check the rate-distortion (RD) cost for the prediction from each layer. In fact, the complexity can go up by N-fold for N reference layers since the RD cost calculation is the most complex task at the encoder.

SUMMARY OF THE INVENTION

These and other drawbacks and disadvantages of the prior art are addressed by the present described embodiments, which are directed to a method and apparatus for intra prediction with multiple reference layers for encoding and decoding video signals.

According to an aspect of the described aspects, there is provided a method. The method comprises forming a plurality of reference arrays from reconstructed samples of a block of video data. The method further comprises predicting a target pixel of the block of video data respectively from one or more of the plurality of reference arrays, and computing a final prediction for the target pixel of the block of video as a function of predictions respectively from one or more of the reference arrays. The method further comprises encoding the block of video using the final prediction.

According to another aspect of the described aspects, there is provided a method. The method comprises forming a plurality of reference arrays from decoded samples of a block of video data. The method further comprises predicting a target pixel of the block of video data respectively from one or more of the plurality of reference arrays, and computing a final prediction for the target pixel of the block of video as a function of predictions respectively from one or more of the reference arrays. The method further comprises decoding the block of video using the final prediction.

According to an aspect of the described aspects, there is provided a method. The method comprises forming N reference arrays from reconstructed samples of a block of video data. The method further comprises predicting a target pixel of the block of video data respectively from the N reference arrays, and computing a final prediction for the target pixel of the block of video as a weighted combination of predictions respectively from the N reference arrays. The method further comprises encoding the block of video using the final prediction.

According to another aspect of the described aspects, there is provided a method. The method comprises forming N reference arrays from decoded samples of a block of video data. The method further comprises predicting a target pixel of the block of video data respectively from the N reference arrays, and computing a final prediction for the target pixel of the block of video as a function of predictions respectively from the N reference arrays. The method further comprises decoding the block of video using the final prediction.

According to another aspect of the described aspects, there is provided an apparatus. The apparatus comprises a memory, and a processor, configured to perform forming a plurality of reference arrays from reconstructed samples of a block of video data. The method further comprises predicting a target pixel of the block of video data respectively from one or more of the plurality of reference arrays, and computing a final prediction for the target pixel of the block of video as a function of predictions respectively from one or more of the reference arrays. The method further comprises encoding, or decoding, the block of video using the final prediction.

According to another aspect of the described aspects, there is provided a non-transitory computer readable medium containing data content generated according to any of the aforementioned encoding embodiments.

According to another aspect of the described aspects, there is provided a signal comprising video data generated according to any of the aforementioned encoding embodiments.

According to another aspect of the described aspects, there is provided a computer program product comprising instructions which, when the program is executed by a computer, cause the computer to carry out any of the aforementioned decoding embodiments.

These and other aspects, features and advantages of the present principles will become apparent from the following detailed description of exemplary embodiments, which is to be read in connection with the accompanying drawings.

BRIEF DESCRIPTION OF THE DRAWINGS

FIG. 10 shows one embodiment of an apparatus for encoding or decoding video data using multiple reference intra prediction.

DETAILED DESCRIPTION

Figure 1:
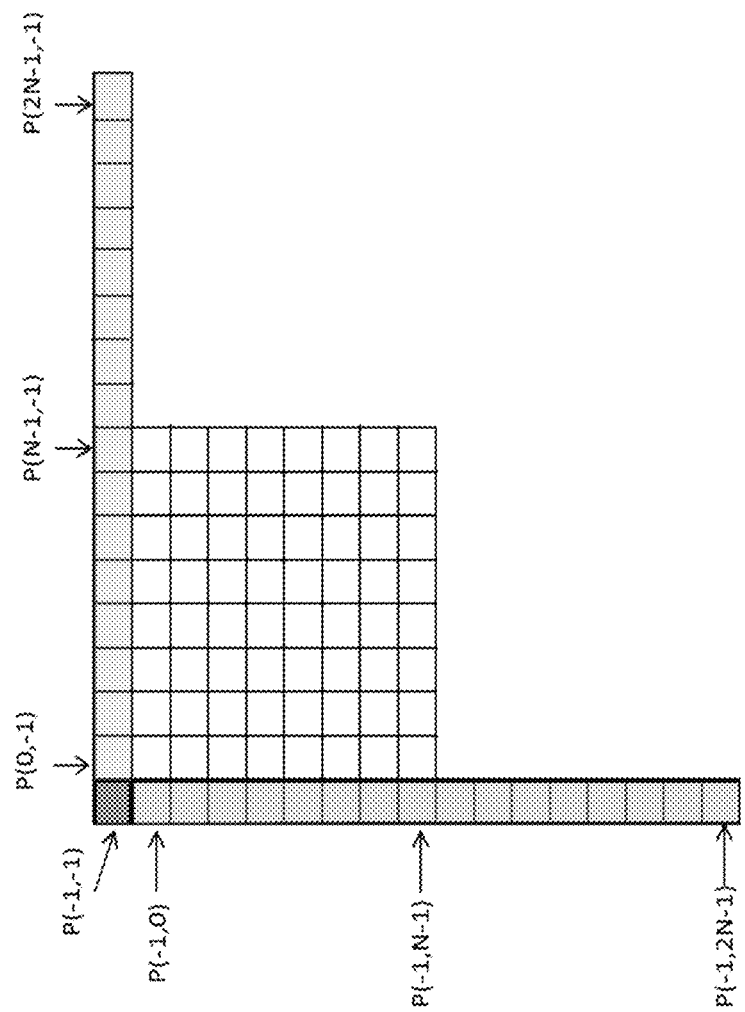
FIG. 1 illustrates reference samples for intra prediction in HEVC.

The general concepts described here deal with intra prediction in video compression. In HEVC and older video coding standards, intra prediction of a target block uses only one decoded row of pixels on the top, and one column of pixels on the left, of the block as reference samples. The reference samples, being closest to the target block, provide quite good prediction accuracy if the target block size is relatively small and there are only a few prediction modes, as specified in the earlier standards. In HEVC, the target block size has been increased to 64×64 from earlier standards in order to support the compression of high resolution video. Corresponding to the block size, the number of intra prediction modes has been increased to 35. In JEM and future video coding standards, block sizes of 256×256 with up to 131 prediction modes are being explored. In these cases, using additional rows and columns of reference samples can lead to better prediction and hence higher coding gain.

As mentioned, HEVC and older video coding standards perform intra prediction of a target block using only one decoded row of pixels on the top, and one column of pixels on the left, of the block as reference samples. As will be described, it is proposed here to use more than one row and column of decoded pixels to improve the prediction for strictly angular prediction modes. For angular modes, the predicting samples on the reference array may have non-integral indices. In HEVC, in this case, the reference samples are interpolated using linear interpolation of two nearest reference samples. Since the interpolated values are just estimates, the estimation can be improved by using samples from the nearby decoded pixels. Therefore, it makes sense to use additional rows on the top, or columns on the left, of the target block as references.

Intra prediction in video compression refers to the spatial prediction of a block of pixels using the information from causal neighboring blocks, that is, the neighboring blocks in the same frame which have already been decoded. This is a powerful coding tool since it allows for high compression efficiency in INTRA frames, as well as in INTER frames whenever there is no better temporal prediction. Therefore, intra prediction has been included as a core coding tool in all video compression standards including H.264/AVC, H.265/HEVC, etc. In the following, for explanation purpose, we will refer to the intra prediction in HEVC standard and the current efforts to improve upon it, such as the JEM (Joint Exploration Model Team).

In HEVC, encoding of a frame of video sequence is based on a quad-tree (QT) block structure. A frame is divided into square coding tree units (CTUs) which all undergo quad-tree based splitting to multiple coding units (CUs) based on rate-distortion criteria. In Intra prediction, a CU is spatially predicted from the causal neighbor CUs, i.e., the CUs on the top and top-right, the CUs on the left and left-bottom, and the top-left CU. Based on the decoded, or reconstructed, pixel values in these CUs, called reference pixels, the encoder constructs different predictions for the target block and chooses the one that leads to the best RD performance. The predictions are specified as 35 prediction modes, out of which one is a planar mode (indexed as mode 0), one is a DC mode (indexed as mode 1) and the remaining 33 (indexed as mode 2-34) are angular modes. The residual signal from the prediction further undergoes transformation, quantization, and arithmetic coding before being transmitted to the decoder.

For constructing the prediction for a target block, both the encoder and the decoder use only one row of reference samples on the top and one column of reference samples on the left of the block. These references, being the closest to the target block carry the maximum amount of correlation with the target block content, and therefore using additional decoded rows and columns has not been thought necessary due to higher complexity and memory requirements. But this logic is applicable when the target block sizes are small and there are only a few angular prediction modes. As the block size and the number of prediction modes are increased, the prediction from one reference row and column can be made more accurate by using directional information from additional reference rows and columns. Before presenting the theory, the intra prediction process in HEVC is summarized below.

Figure 6:
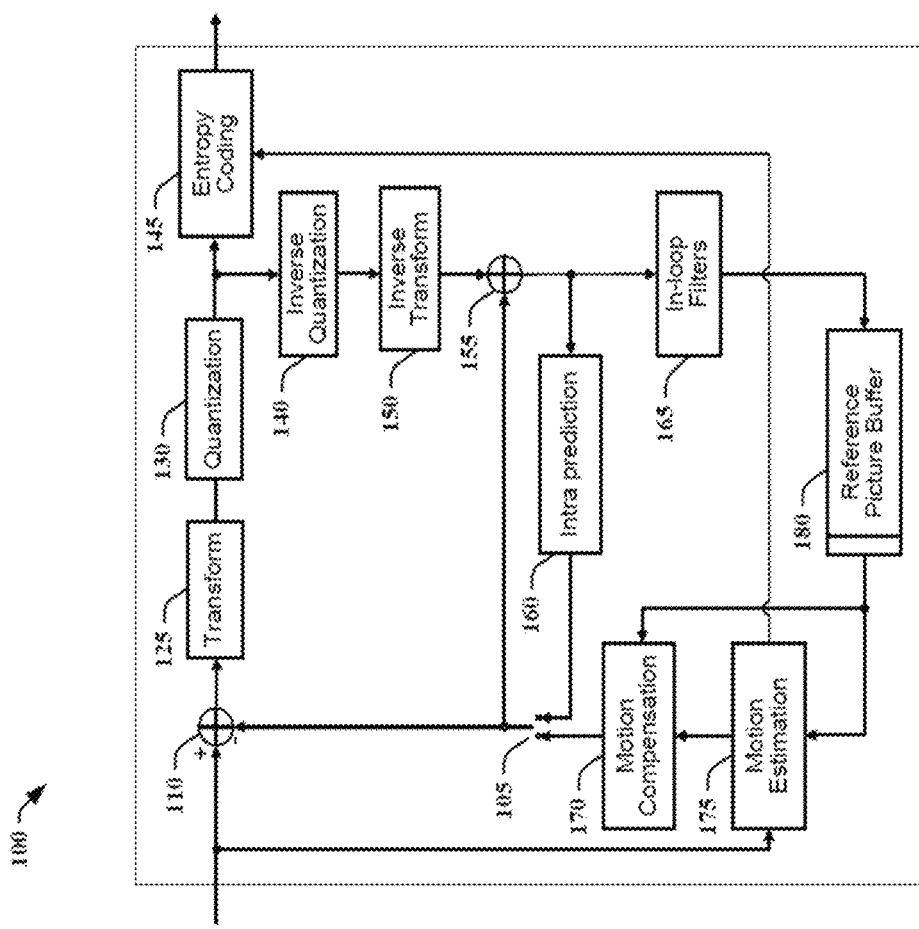
FIG. 6 shows an exemplary HEVC encoder to which the present embodiments can be applied.
Figure 7:
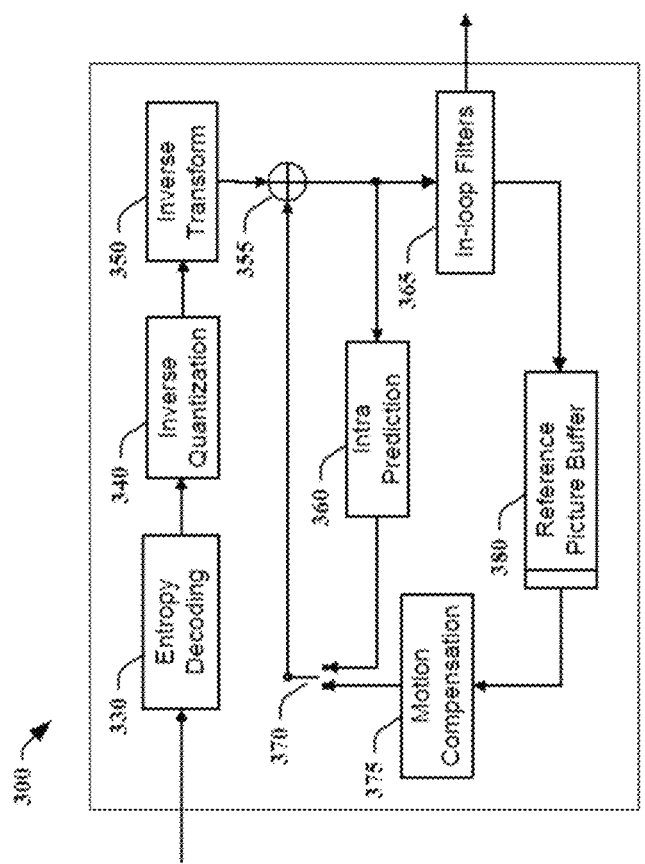
FIG. 7 shows an exemplary HEVC decoder.

An exemplary HEVC encoder 100 is shown in FIG. 6. To encode a video sequence with one or more pictures, a picture is partitioned into one or more slices where each slice can include one or more slice segments. A slice segment is organized into coding units, prediction units and transform units. A corresponding exemplary HEVC decoder is shown in FIG. 7.

In the present application, the terms "reconstructed" and "decoded" may be used interchangeably, and the terms "picture" and "frame" may be used interchangeably. Usually, but not necessarily, the term "reconstructed" is used at the encoder side while "decoded" is used at the decoder side.

The HEVC specification distinguishes between "blocks" and "units," where a "block" addresses a specific area in a sample array (e.g., luma, Y), and the "unit" includes the collocated blocks of all encoded color components (Y, Cb, Cr, or monochrome), syntax elements, and prediction data that are associated with the blocks (e.g., motion vectors).

For coding, a picture is partitioned into coding tree blocks (CTB) of square shape with a configurable size, and a consecutive set of coding tree blocks is grouped into a slice. A Coding Tree Unit (CTU) contains the CTBs of the encoded color components. A CTB is the root of a quadtree partitioning into Coding Blocks (CB), and a Coding Block may be partitioned into one or more Prediction Blocks (PB) and forms the root of a quadtree partitioning into Transform Blocks (TBs). Corresponding to the Coding Block, Prediction Block and Transform Block, a Coding Unit (CU) includes the Prediction Units (PUs) and the tree-structured set of Transform Units (Tus), a PU includes the prediction information for all color components, and a TU includes residual coding syntax structure for each color component. The size of a CB, PB and TB of the luma component applies to the corresponding CU, PU and TU. In the present application, the term "block" can be used to refer to any of CTU, CU, PU, TU, CB, PB and TB. In addition, the "block" can also be used to refer to a macroblock and a partition as specified in H.264/AVC, H.265 or other video coding standards, and more generally to refer to an array of data of numerous sizes.

In the exemplary encoder 100 of FIG. 6, a picture is encoded by the encoder elements as described below. The picture to be encoded is processed in units of CUs. Each CU is encoded using either an intra or inter mode. When a CU is encoded in an intra mode, it performs intra prediction (160). In an inter mode, motion estimation (175) and compensation (170) are performed. The encoder decides (105) which one of the intra mode or inter mode to use for encoding the CU, and indicates the intra/inter decision by a prediction mode flag. Prediction residuals are calculated by subtracting (110) the predicted block from the original image block.

To exploit the spatial redundancy, CUs in intra mode are predicted from reconstructed neighboring samples within the same slice. The causal neighboring CUs have already been encoded/decoded when the encoding/decoding of the current CU is considered. To avoid mismatch, the encoder and the decoder have the same prediction. Therefore, both the encoder and the decoder use the information from the reconstructed/decoded neighboring causal CUs to form prediction for the current CU.

The intra prediction process in HEVC includes three steps: (1) reference sample generation, (2) intra sample prediction, and (3) post-processing of predicted samples. Exemplary HEVC reference samples are illustrated in FIG. 1, where the reference pixel value at coordinate (x,y), with respect to one pixel above and to the left of the above-left corner of the current block, is indicated by R(x,y), and the predicted sample value at coordinate (x,y) of the current block is indicated by P(x,y). For a CU of size N×N, a row of 2N decoded samples on the top is formed from the decoded CUs. Similarly, a column of 2N samples on the left is formed from the decoded CUs. The corner pixel from the above-left decoded CU is used to fill up the gap between the above row and the left column references. If some of the samples are not available, for example, when the corresponding CUs is not in the same slice or the current CU is at a frame boundary, then reference sample substitution is performed where the missing samples are copied from the available samples in a clock-wise direction. Then, depending on the current CU size and the prediction mode, the reference samples are filtered using a specified filter. "Pixel" and "sample" are used interchangeably, unless otherwise noted.

Figure 2:
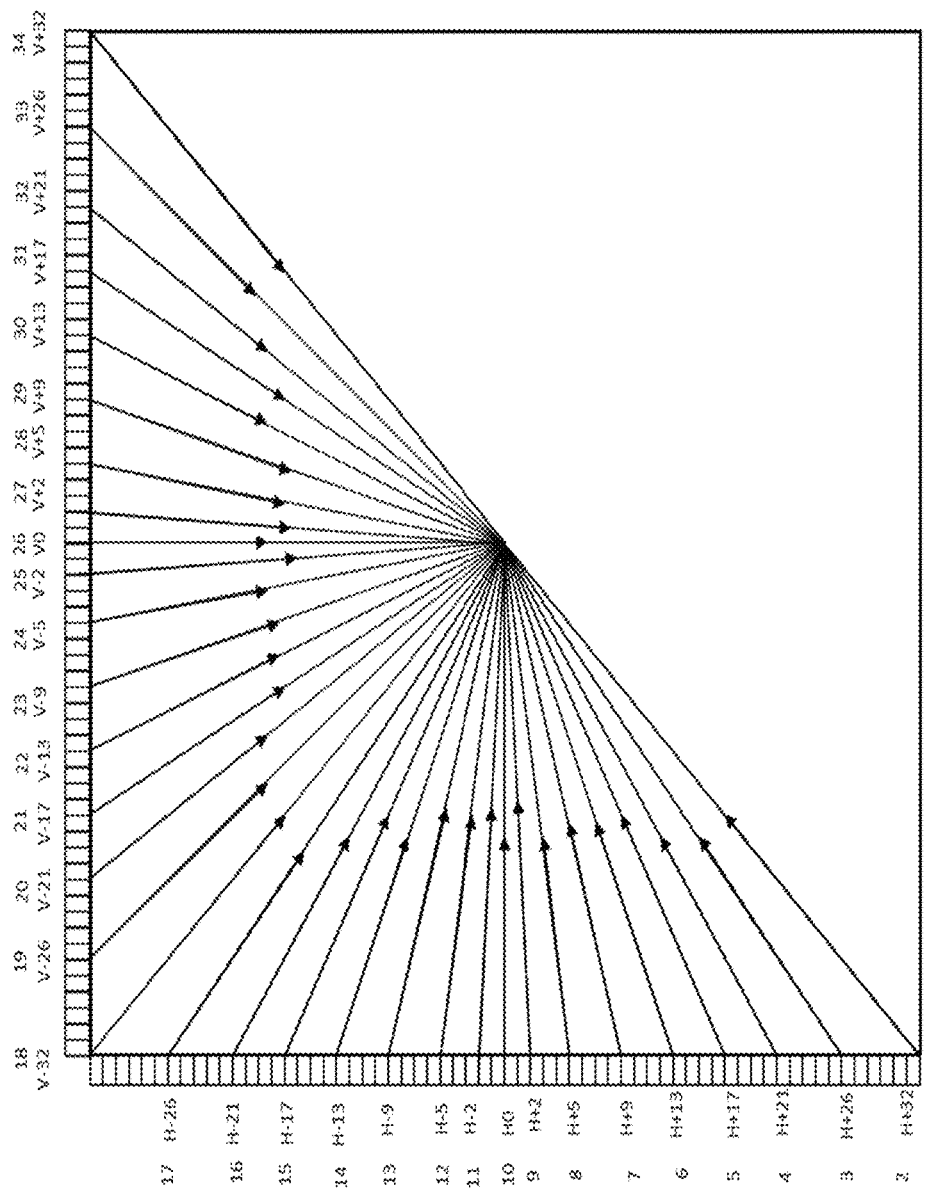
FIG. 2 illustrates intra prediction directions in HEVC.

The next step, the intra sample prediction, comprises predicting the pixels of the target CU based on the reference samples. To predict various kinds of content efficiently, HEVC supports a range of prediction methods. In particular, Planar and DC prediction modes are used to predict smooth and gradually changing regions, whereas directional prediction modes (also referred to as "angular prediction modes") are used to capture different directional structures. HEVC supports 33 directional prediction modes which are indexed from 2 to 34. These prediction modes correspond to different prediction directions as illustrated in FIG. 2, wherein the numbers (i.e., 2, 3, . . . , 34) denote intra prediction mode indices. The prediction modes 2-17 are denoted as horizontal prediction modes (H−26 to H+32), as the predominant sources of prediction are in a horizontal direction. The modes 18-34 are denoted as vertical prediction modes (V−32 to V+32) accordingly. "H" and "V" in FIG. 2 are used to indicate the horizontal and vertical directionalities, respectively, while the numeric part of the identifier indicates the pixels' displacement (also referred to as "angle parameter") at 1⁄32 pixel fractions.

Table 1 shows the relationship between the directional prediction mode and the angle parameter A, which indicates the position of the reference sample (at a resolution of 1⁄32 of a pixel) from a target pixel on the first row or first column, as specified by HEVC.

TABLE 1

| Horizontal directions | | | | | | | | | | | | | | | | |
|---|---|---|---|---|---|---|---|---|---|---|---|---|---|---|---|---|
| Mode index | 2 | 3 | 4 | 5 | 6 | 7 | 8 | 9 | 10 | 11 | 12 | 13 | 14 | 15 | 16 | 17 |
| A | 32 | 26 | 21 | 17 | 13 | 9 | 5 | 2 | 0 | −2 | −5 | −9 | −13 | −17 | −21 | −26 |

| Vertical directions | | | | | | | | | | | | | | | | |
|---|---|---|---|---|---|---|---|---|---|---|---|---|---|---|---|---|
| Mode index | 18 | 19 | 20 | 21 | 22 | 23 | 24 | 25 | 26 | 27 | 28 | 29 | 30 | 31 | 32 | 33 | 34 |
| A | −32 | −26 | −21 | −17 | −13 | −9 | −5 | −2 | 0 | 2 | 5 | 9 | 13 | 17 | 21 | 26 | 32 |

The directions with non-negative displacements (i.e., H0 to H+32 and V0 to V+32) are also denoted as positive directions, and the directions with negative displacements (i.e., H−2 to H−26 and V−2 to V−32) are also denoted as negative directions.

As shown in FIG. 2, the defined angular directions have a sample accuracy of 1⁄32. That is, between any two adjacent reference samples, there are 32 possible directions. As described above, the defined directions can be distinguished as either vertical or horizontal. The prediction modes in horizontal directions use either only left reference samples, or some left and some top reference samples. Similarly, the prediction modes in vertical directions use either only top reference samples, or some top and some left reference samples. The directions which use only left reference samples or only the top reference samples are defined to be positive directions. The horizontal positive directions from H0 to H+32 use only the left reference samples for prediction. Similarly, the vertical positive directions from V0 to V+32 use only the top reference samples for prediction. Negative horizontal and vertical directions (H−2 to H−26 and V−2 to V−32) use reference samples both on the left and on the top for prediction. In HEVC reference code, a reference array is first constructed using the top and left reference samples. For vertical predictions, the reference array is horizontal and for horizontal predictions, the reference array is vertical. For the modes with positive angle parameter A (modes 2 to 10 and 26 to 34), the reference array is simply the top or left reference samples depending on the direction:

topRef[x]=P[x−1][−1], 0≤x≤2N, for vertical predictions leftRef[$y$]=$P$[−1][$y$−1], 0≤$y$≤2$N$, for horizontal predictions where N is the CU size. It is conventional to initialize the sample coordinates to (0,0) at the top-left pixel of the target CU. Therefore, the top reference samples will have their y-coordinate as −1 and the left reference samples will have their x-coordinate as −1.

For the modes with negative angle parameter A (modes 11 to 25), the reference array needs pixels from both the top and left reference. In this case, the reference array will extend to the negative indices beyond 0. Sample values on the reference array with positive indices are obtained as above depending on vertical or horizontal prediction. Those on the reference array with negative indices are obtained by projecting the left reference pixels (for vertical predictions) or top reference pixels (for horizontal predictions) on the reference array along the prediction direction.

Once the reference array is constructed, the prediction at any pixel position (x,y) inside the target CU is obtained by projecting the pixel position to the reference array along the selected direction and then copying the reference array sample value at (x,y). The reference sample value is computed at a sample resolution of (1/32) by interpolating between two adjacent samples as illustrated below:

$P$[$x$][$y$]=((32−$f$)*topRef[$x$+$i$+1]+$f$*topRef[$x$+$i$+2]+16)
>>5),0≤$x$,$y$<$N$ for vertical predictions;

$P$[$x$][$y$]=((32−$f$)*leftRef[$y$+$i$+1]+$f$*leftRef[$y$+$i$+2]+16)
>>5), 0≤$x$,$y$<$N$, for horizontal predictions, where i and f denote the integral part and the fractional part of the projected displacement from the pixel location (x,y). If Δ denotes the projected displacement, then Δ=($x$+1)*$A$, for horizontal predictions, and Δ=($y$+1)*$A$, for vertical predictions.

The integral and fraction parts of the displacement are then obtained as follows:

$i$=Δ>>5, $f$=Δ&31.

Notice that, if f=0, that is, there is no fractional part, then the prediction is equal to the reference array sample value in the direction of prediction. In this case, there is no need of interpolation.

Some of the prediction modes such as the DC mode and directly horizontal (H0 or 10) and vertical modes (V0 or 26) may cause discontinuity at the CU boundaries after the prediction. Therefore, in HEVC, as well as in JEM, such prediction modes are followed by a post-processing step where the boundary predicted samples are smoothed using a low-pass filter.

Figure 3:
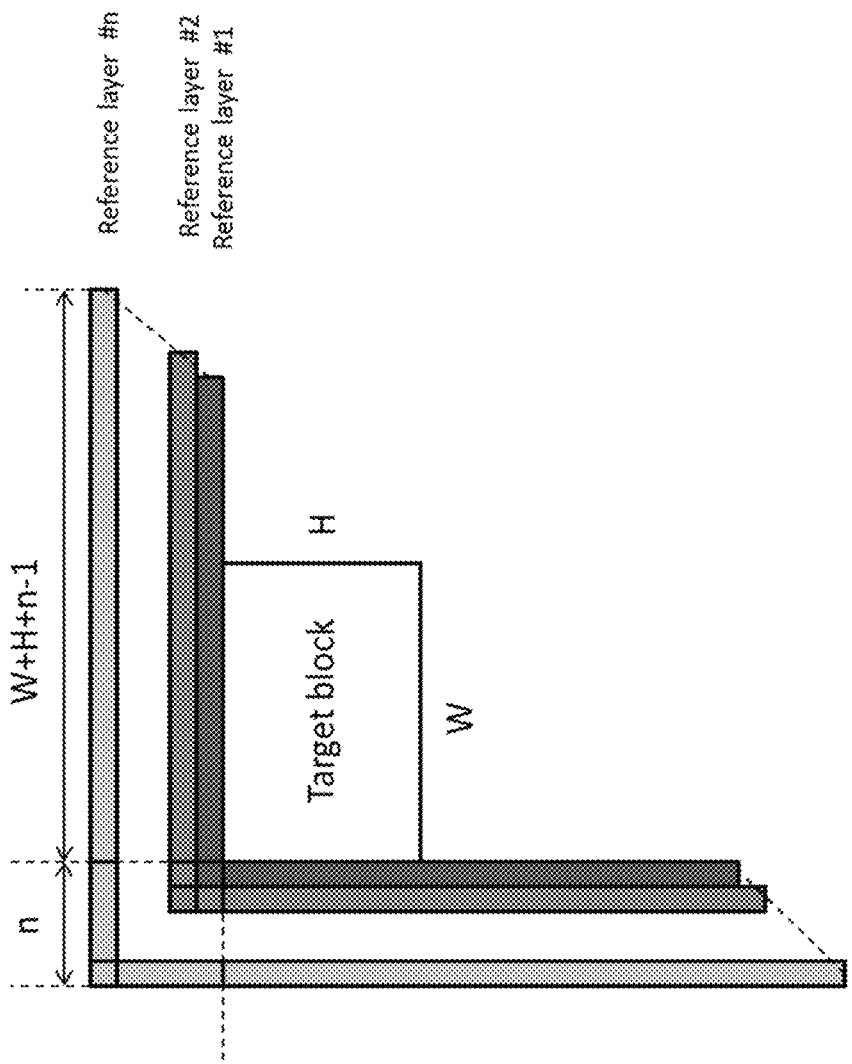
FIG. 3 illustrates multi-reference intra prediction where reference n refers to the nth reference row and column.

Multi-reference intra prediction refers to the intra prediction using multiple rows and columns of reference pixels, an example as shown in FIG. 3. It is also called arbitrary tier reference intra prediction or multi-line intra prediction. In image processing, it is common to use first-order prediction models because of high correlation. The reason for using one row and column as reference in intra-prediction was originally based on this, and on the fact that other decoded rows and columns are farther from the target block pixels, and they do not add much additional information about the target block. This is alright when the number of prediction directions is small (e.g., <=7) and the block size is also small (e.g., <=8), as in earlier standards. However, in HEVC, the prediction unit size has been increased to 64×64 along with a corresponding increase in the number of angular prediction directions to 33. For future standards, block sizes up to 256×256 with the number of angular prediction modes up to 129 are under study. Considering this, it makes sense to use additional rows and columns of decoded pixels for reference when the trade-off between the cost due to additional memory and complexity, and the coding gain is acceptable.

Figure 4A:
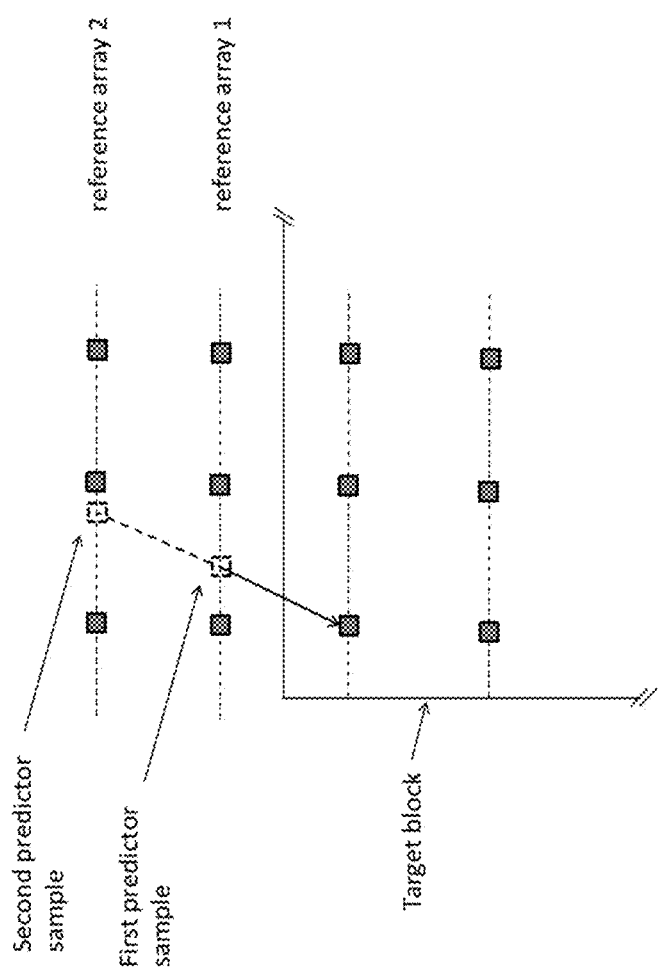
FIG. 4(a) shows one example of intra prediction with two references.
Figure 4B:
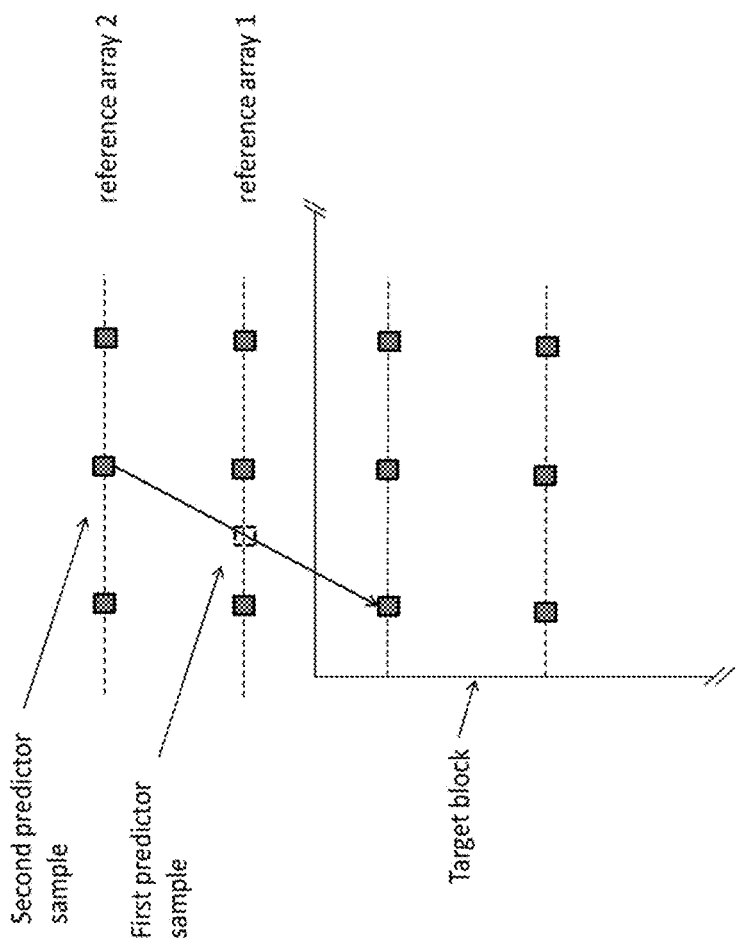
FIG. 4(b) shows a second example of intra prediction with two references.

Consider a vertical angular prediction mode when the predicting sample for a target pixel is in between two reference samples on the top reference array, for example as shown in FIG. 4($a$). In this case, in HEVC, the predicting sample will be linearly interpolated, as mentioned in the previous section. The predicting sample is just an estimate. If we extend the prediction direction by one more row, the line will cross the second row at a different point. Even though the second row of pixels is slightly farther from the target than the first row, because of the directionality of object structures in an image, the second-row estimate may be a better estimate than the first one. In some cases, it may even intersect the second row exactly at the location of a decoded pixel, as shown in FIG. 4($b$). Based on this idea, it is proposed here to predict the target block based on multiple references.

For referring to the different reference row/column pairs, we will use the term "reference layer". Thus, reference layer 1 will mean the reference row and column next to the target block (i.e., the usual references in HEVC), reference layer 2 will mean the reference row and column next to the reference layer 1, and so on.

For making the prediction, we will form top and left reference arrays corresponding to a reference layer, as we mentioned in the previous section. We will refer to them as reference array 1, reference array 2, and so on. Note that reference array n, n=1, 2, . . . can mean either the top reference array, or the left reference array, depending on whether the prediction mode corresponds to a vertical or horizontal direction, respectively.

The embodiments described here propose a different method from the prior art. This method is based on the fact that the first reference layer, i.e., the reference layer closest to the target block, contains the maximum amount of information about the target block content and as we move to farther reference layers, those reference layers will have less correlation with the target block. Therefore, instead of selecting one of the reference layers for the prediction, as done in the prior art, we propose to use a function, such as a weighted-average, of predictions made with one or more of the reference layers.

Since the horizontal predictions can be implemented as vertical predictions after swapping the top reference array and left reference array, and swapping the height and the width of the target block, only the vertical predictions will be referred to below. First, the reference samples are generated for each layer following a reference sample generation method, such as that in HEVC or JEM. Then the reference arrays are formed using those samples. For the modes with positive angle parameter A (modes 2 to 10 and 26 to 34), the reference array #n is simply the top reference samples of reference layer #n:

Ref$_n$[$x$]=$P$[$x$−$n$][−$n$], 0≤$x$≤$W$+$H$+2$n$−2, $n$=1,2,3, . . .

For the modes with negative angle parameter A (modes 11 to 25), sample values on the reference array with positive indices are obtained as above and those with negative indices are obtained by projecting the left reference pixels of the corresponding reference layer on the reference array along the prediction direction.

Once the reference arrays are constructed, predictions are generated for each target pixel projecting the pixel position to the reference arrays along the selected direction. The prediction with a reference array is computed at a sample resolution of (1/32) by interpolating between two adjacent samples on that reference array as illustrated below:

$$P_n[x][y]=((32-f_n)*\text{Ref}_n[x+i_n+n]+f_n*\text{Ref}_n[x+i_n+n+1]+16)>>5), 0\leq x<W, 0\leq y<H;$$

where $P_n[x][y]$ denotes the prediction made at target pixel location (x,y) using the reference array n. In the above expression, $i_n$ and $f_n$ denote the integral part and the fractional part of the projected displacement from the pixel location (x,y) on the reference array #n. The projected displacement on reference array #n can be computed as $$\Delta_n=(x+n)*A, \text{ for horizontal predictions, and}$$

$$\Delta_n=(y+n)*A, \text{ for vertical predictions.}$$

Thus, the integral and fraction parts of the displacement are computed as:

$$i_n=\Delta_n>>5,$$

$$f_n=\Delta_n\&31.$$

Finally, compute the prediction for the target pixel at (x,y) as $$P[x][y] = \frac{w_1*P_1[x][y] + w_2*P_2[x][y] + \ldots + w_N*P_N[x][y]}{w_1 + w_2 + \ldots + w_N},$$

where $w_1, w_2, \ldots, w_N$ are weights known to both the encoder and the decoder. N here represents the number of reference layers used for the intra prediction. For convenience of implementation, the weights can be normalized such that $$w_1+w_2+\ldots+w_N=2^K$$

for some positive integer K.

Figure 5:
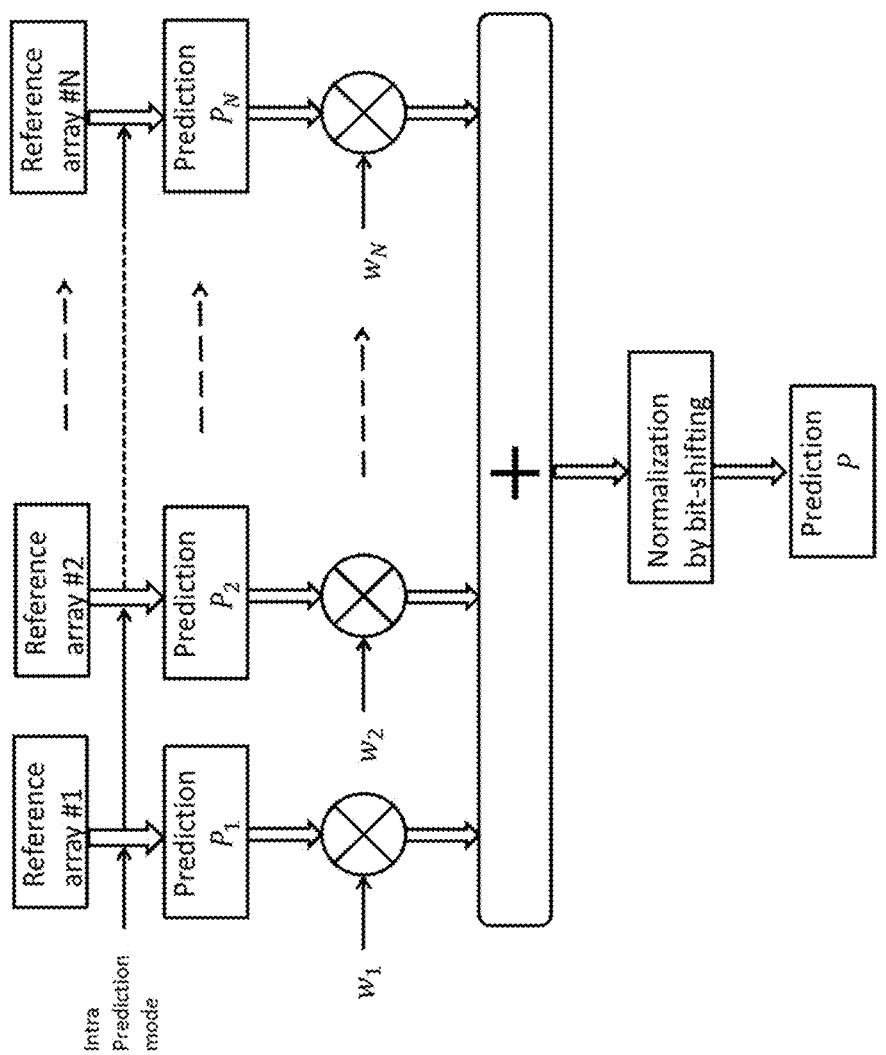
FIG. 5 shows one embodiment of weighted multiple reference intra prediction.

An example of this proposed method is shown in the block diagram of FIG. 5.

The weights $w_1, w_2, \ldots, w_N$ can be determined in various ways:

(1) The weighted average is a linear regression model with the normalized weights equal to the regression model parameters. Therefore, depending on the number of reference layers used, i.e. the order of prediction, the weights can be pre-determined by offline training or learning methods with many test sequences, or determined on-the-fly at the encoder for a given frame and transmitted to the decoder in the header. If the weights are pre-determined by offline training or learning methods, there is no necessity to transmit them to the decoder.

(2) The weights can be chosen heuristically, or using any model (e.g., Gaussian), that results in decreasing weights with the distance of the reference layer from the target block.

It is to note that computed weights can be fixed for all angular intra prediction modes and/or target block sizes, or they can be varied depending on the intra prediction mode and/or target block size. Furthermore, for a given prediction mode, the same weights can be used for all pixels in a target block, or they can be varied, following some model or heuristically, depending on the distance of the target pixel from the reference arrays.

The above explanation uses the specifications of HEVC and JEM for the number of prediction modes, the sample resolution of a prediction direction, etc. However, the theory presented is not limited to those specifications, and can be applied even when those parameters are modified or updated in future standards. The same applies to the estimation of the predicting reference samples at fractional positions. Here, the linear interpolation using the two nearest reference samples has been shown, as is done in HEVC, for illustration purpose. However, one can also apply other advanced methods, such as using any n-tap interpolation filters or Gaussian interpolation filters as done in JEM, or any other future methods.

The following sections present several embodiments that use the proposed intra prediction with multiple references. These example embodiments are shown assuming use of the JEM codec, which is based on the HEVC codec. The intra-prediction tools such as Position Dependent Intra Prediction Combination (PDPC) and Reference Sample Adaptive Filtering (RSAF), are assumed deactivated, or activated whenever a target block uses a single reference layer for intra prediction.

Embodiment 1

This embodiment, for predicting a LUMA target block using any angular intra prediction mode, uses N reference layers where N can be 2 to 4. For lower complexity, assume N to be fixed. However, in general, N can be variable, in which case, the encoder needs to transmit the value of N to the decoder. Before making prediction, the reference arrays are constructed exactly in the same manner as in JEM, by using the already decoded pixels in the top, top-right, left, left-bottom, and top-left CUs. Then, for each target pixel, a prediction value is computed using each reference array, multiply them by their associated weights and add them up, and then normalize the sum by bit-shifting to obtain the final prediction value. The weights are obtained using any of the methods mentioned in the previous section. For CHROMA target blocks, we also follow the analogous method with the difference that, for 4:2:1 video format, one chroma reference layer is used for every two luma reference layers. The weights associated with chroma prediction can be obtained separately from the weights for the luma prediction.

Embodiment 2

In this embodiment, a LUMA target block is predicted in the same manner as in Embodiment 1, and also by the standard single reference method. Between these two predictions, the one that results in better rate-distortion (RD) performance is chosen, and the prediction is signaled to the decoder using a one bit flag at the CU level. The flag is context-encoded using either a fixed context, or a prediction mode-dependent or neighborhood-dependent context. For a CHROMA target block, one of two approaches can be followed. For one approach, apply the same prediction method (i.e., either multi-reference or single reference) as done for an associated LUMA target block. In this case, there is no need to transmit a separate signaling flag for the CHROMA blocks. The decoder derives the type prediction method from an associated LUMA target block. In another approach, both multi-reference and single reference predictions are found for a CHROMA target block and the one that results in better RD performance is chosen. In this case, the prediction method is signaled using a one bit flag at the CU level. Like the flag for the LUMA blocks, the flag is context-encoded using either a fixed context, or a prediction mode-dependent or neighborhood dependent context. For the target blocks which are predicted using a single reference layer, other intra prediction tools such as PDPC and RSAF can be optionally activated.

Embodiment 3

In this embodiment, all target blocks in a slice are predicted as in Embodiment 1 or Embodiment 2 and this is signaled to the decoder using a one bit flag in the slice header.

Embodiment 4

In this embodiment, all target blocks in a frame are predicted as in Embodiment 1 or Embodiment 2 and this is signaled to the decoder using a one bit flag in the Picture Parameter Set (PPS) header.

Embodiment 5

In this embodiment, all target blocks in any frame of a sequence are predicted as in Embodiment 1 or Embodiment 2 and this is signaled to the decoder using a one bit flag in the Sequence Parameter Set (SPS) header.

Embodiment 6

In this embodiment, for predicting a Luma (or Chroma) target block using any angular intra prediction mode, uses N reference layers, as in Embodiment 1. The number of reference N is dependent on the prediction mode used (intra prediction direction, PDPC index, RSAF index, for example). For example, N+1 when PDPC index=1 or RSAF index=1, or intra prediction direction is purely horizontal or vertical. This means that in these particular modes, the standard single reference method applies. This can be used in combination with Embodiment 2, in that when multiple reference prediction is allowed, it is signaled whether to use it or not.

The proposed intra prediction aims to improve the prediction accuracy of a target block using additional reference layers, thus leading to higher coding gain. Since the encoder does not have to check for the RD performance with each reference layer, as done in the prior art, the additional complexity requirements at the encoder will be lower when the number of reference layers is greater than 2. In fact, if all the target blocks are forced to have weighted multi-reference prediction, the complexity would be slightly more than that required by the single reference prediction. At the decoder side, the complexity increase will be solely for constructing multiple predictions and thus will be minimal.

Figure 8:
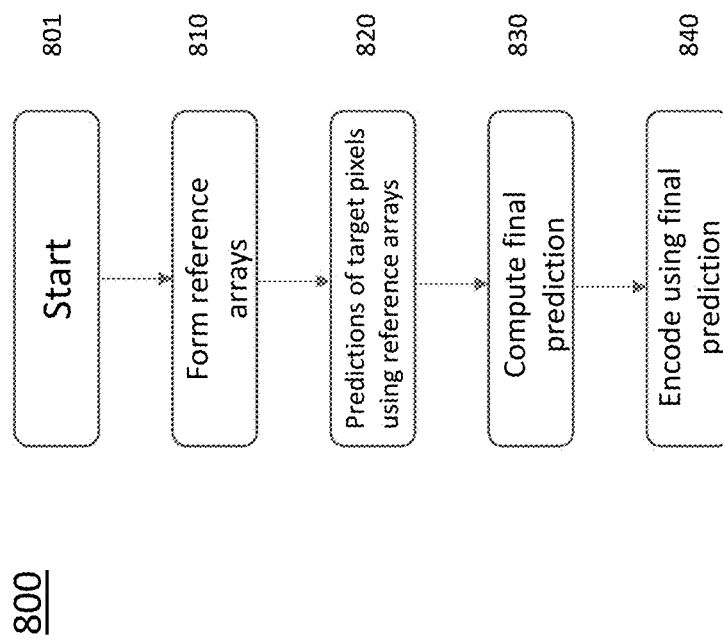
FIG. 8 shows one embodiment of a method for encoding video data using multiple reference intra prediction.

One embodiment of a method 800 for encoding a block of video data using the general aspects described here is shown in FIG. 8. The method commences at Start block 801 and control proceeds to function block 810 for forming reference arrays. Control proceeds from block 810 to block 820 for generating predictions of a block of target pixels using respective reference arrays. Control proceeds from block 820 to block 830 for computing a final prediction, which is a function of the predictions made in block 820. This function can be a weighted combination of the predictions. Control proceeds from block 830 to block 840 for encoding using the generated final prediction.

Figure 9:
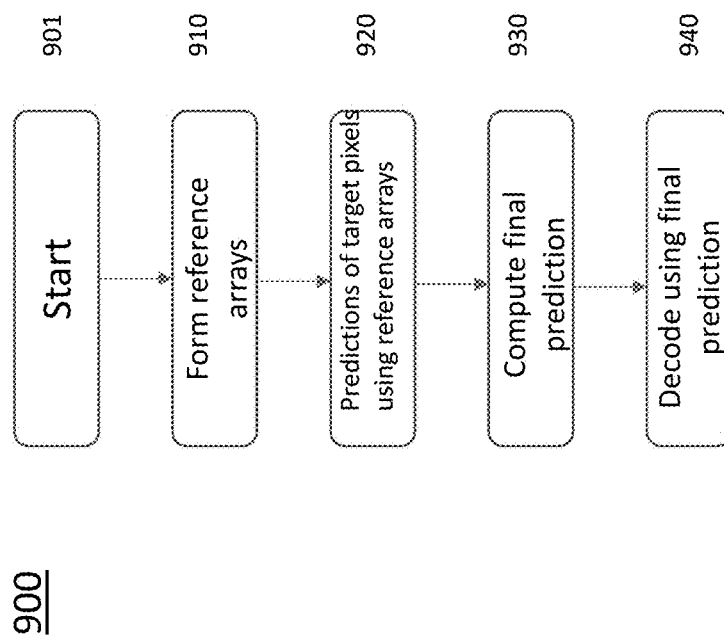
FIG. 9 shows one embodiment of a method for decoding video data using multiple reference intra prediction.

FIG. 9 shows one embodiment of a method 900 for decoding a block of video data using the general aspects described here. The method commences at Start block 901 and control proceeds to function block 910 for forming reference arrays. Control proceeds from block 910 to block 920 for generating predictions of a block of target pixels using respective reference arrays. Control proceeds from block 920 to block 930 for computing a final prediction, which is a function of the predictions made in block 920. This function can be a weighted combination of the predictions. Control proceeds from block 930 to block 940 for decoding using the generated final prediction.

FIG. 10 shows one embodiment of an apparatus 1000 for encoding or decoding a block of video data. The apparatus comprises Processor 1010 and Memory 1020, which are interconnected through at least one port. Both Processor 1010 and Memory 1020 can also have one or more additional interconnections to external connections.

Processor 1010 is configured to either encode or decode video data by forming a plurality of reference arrays from reconstructed samples of a block of video data, predicting a target pixel of the block of video data respectively from one or more of the plurality of reference arrays, computing a final prediction for the target pixel of the block of video as a function of predictions respectively from one or more of the reference arrays and, either encoding or decoding the block of video using the final prediction.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

The present description illustrates the present principles. It will thus be appreciated that those skilled in the art will be able to devise various arrangements that, although not explicitly described or shown herein, embody the present principles and are included within its scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

In conclusion, an improved method of performing intra prediction for encoding or decoding is provided that uses interpolation. In the interpolation, substitute samples are found for samples to be used in the interpolation calculation that lie outside a normal reference range. The substitute samples can be repeated end samples from the bottom of a reference portion to the left of the target block, or right samples of a reference portion above the target block, or some calculated or estimated value based on known reference samples. An encoder can signal to a decoder whether to use intra prediction or interpolation prediction.

The invention claimed is:

1. A method, comprising:
   obtaining a plurality of reference arrays based on a plurality of reconstructed samples neighboring a block of video data, wherein the plurality of reference arrays include a first reference array located one pixel position from the block of video data and one or more second reference arrays respectively located at pixel positions greater than the one pixel position from the block of video data;
   obtaining a intra prediction for a target pixel of the block of video, the final intra prediction being based on a function of a plurality of predicted samples respectively from the plurality of reference arrays, wherein the function comprises a weighted combination of the plurality of predicted samples, and wherein a plurality of weights of the weighted combination decrease as distances between the target pixel and the respective reference arrays increase; and
   encoding the block of video using the intra prediction.

2. The method of claim 1, wherein each of the plurality of reference arrays respectively comprises a row of pixels above, and a column of pixels to the left of, said block of video data.

3. The method of claim 1, wherein the distances between the target pixel and the respective reference arrays are associated with a prediction direction of the intra prediction.

4. The method of claim 1, wherein at least one of the plurality of predicted samples for the target pixel of the block of video data is based on an interpolation of two adjacent reconstructed samples of a respective one of the plurality of reference arrays.

5. The method of claim 1, further comprising:
   signaling a number of the plurality of reference arrays used to obtain the plurality of predicted samples.

6. A method, comprising:
   obtaining a plurality of reference arrays based on a plurality of decoded samples neighboring a block of video data, wherein the plurality of reference arrays include a first reference array located one pixel position from the block of video data and one or more second reference arrays respectively located at pixel positions greater than the one pixel position from the block of video data;
   obtaining a intra prediction for a target pixel of the block of video, the intra prediction being based on a function of a plurality of predicted samples respectively from the plurality of reference arrays, wherein the function comprises a weighted combination of the plurality of predicted samples, and wherein a plurality of weights of the weighted combination decrease as distances between the target pixel and the respective reference arrays increase; and
   decoding the block of video using the intra prediction.

7. The method of claim 6, wherein each of the plurality of reference arrays respectively comprises a row of pixels above, and a column of pixels to the left of, said block of video data.

8. The method of claim 6, wherein the distances between the target pixel and the respective reference arrays are associated with a prediction direction of the intra prediction.

9. The method of claim 6, wherein the at least one of the plurality of predicted samples for the target pixel of the block of video data is based on an interpolation of two adjacent reconstructed samples of a respective one of the plurality of reference arrays.

10. The method of claim 6, further comprising:
    receiving information signaling a number of the plurality of reference arrays used to obtain the plurality of predicted samples.

11. An apparatus, comprising:
    a memory, and
    a processor, configured to:
      obtain a plurality of reference arrays based on a plurality of reconstructed samples neighboring a block of video data, wherein the plurality of reference arrays include a first reference array located one pixel position from the block of video data and one or more second reference arrays respectively located at pixel positions greater than the one pixel position from the block of video data;
      obtain a intra prediction for a target pixel of the block of video, the intra prediction being based on a function of a plurality of predicted samples respectively from the plurality of reference arrays, wherein the function comprises a weighted combination of the plurality of predicted samples, and wherein a plurality of weights of the weighted combination decrease as distances between the target pixel and the respective reference arrays increase; and
      encode the block of video using the intra prediction.

12. The apparatus of claim 11, wherein each of the plurality of reference arrays respectively comprises a row of pixels above, and a column of pixels to the left of, said block of video data.

13. The apparatus of claim 11, wherein the distances between the target pixel and the respective reference arrays are associated with a prediction direction of the intra prediction.

14. The apparatus of claim 11, wherein at least one of the plurality of predicted samples for the target pixel of the block of video data is based on an interpolation of two adjacent reconstructed samples of a respective one of the plurality of reference arrays.

15. An apparatus, comprising:
a memory, and
a processor, configured to:
   obtain a plurality of reference arrays based on a plurality of decoded samples neighboring a block of video data, wherein the plurality of reference arrays include a first reference array located one pixel position from the block of video data and one or more second reference arrays respectively located at pixel positions greater than the one pixel position from the block of video data;
   obtain a intra prediction for a target pixel of the block of video, the intra prediction being based on a function of a plurality of predicted samples respectively from the plurality of reference arrays, wherein the function comprises a weighted combination of the plurality of predicted samples, and wherein a plurality of weights of the weighted combination decrease as distances between the target pixel and the respective reference arrays increase; and
   decode the block of video using the intra prediction.

16. The apparatus of claim 15, wherein each of the plurality of reference arrays respectively comprises a row of pixels above, and a column of pixels to the left of, said block of video data.

17. The apparatus of claim 15, wherein the distances between the target pixel and the respective reference arrays are associated with a prediction direction of the intra prediction.

18. The apparatus of claim 15, wherein at least one of the plurality of predicted samples for the target pixel of the block of video data is based one an interpolation of two adjacent reconstructed samples of a respective one of the plurality of reference arrays.

19. A non-transitory computer readable medium comprising instructions which, when the program is executed by a computer, cause the computer to carry out the method of claim 1.

20. A non-transitory computer readable medium comprising instructions which, when the program is executed by a computer, cause the computer to carry out the method of claim 6.

* * * * *